United States Patent [19]

Andersson et al.

[11] Patent Number: 4,815,006
[45] Date of Patent: Mar. 21, 1989

[54] METHOD AND DEVICE FOR CALIBRATING A SENSOR ON AN INDUSTRIAL ROBOT

[75] Inventors: Björn Andersson; Jan G. Fäger, both of Vasteras, Sweden

[73] Assignee: ASEA Aktiebolag, Vasteras, Sweden

[21] Appl. No.: 98,344

[22] Filed: Sep. 16, 1987

[30] Foreign Application Priority Data

Sep. 29, 1986 [SE] Sweden .............................. 8604101

[51] Int. Cl.$^4$ ...................... G05B 19/10; G05B 19/18; B25J 9/00
[52] U.S. Cl. .................................... 364/513; 318/568; 364/571.01; 901/3; 901/9
[58] Field of Search ...................... 364/513, 559, 571; 318/568, 568 H, 568 A, 568 B, 568 C, 568 D; 901/9, 10, 14, 16, 33, 42, 50, 3

[56] References Cited

U.S. PATENT DOCUMENTS

4,722,063 1/1988 Yasukawa et al. ................. 364/513
4,771,222 9/1988 Nakashima et al. ................ 318/572

Primary Examiner—A. D. Pellinen
Assistant Examiner—David A. Osborn
Attorney, Agent, or Firm—Pollock, Vande Sande & Priddy

[57] ABSTRACT

An industrial robot has a sensor mounted on a hand of the robot which senses the position of an object relative to the sensor. The sensor controls, during automatic operation of the robot, its movement in relation to the object, a robot control system determining the path of the robot in a robot coordinate system on the basis of measurement signals from the sensor. For calibration of the sensor, the sensor is automatically moved to a number of points connected to a calibration object with a known position in the robot coordinate system. At each point a number of measurements of the position of the object in relation to the sensor are made. On the basis of the measurements, those transformations are determined which transform the measurement signals of the sensor to the position of the measuring point in the robot coordinate system.

19 Claims, 11 Drawing Sheets

PROC NORMAL

FIG. 7

PROC KON

FIG. 8

PROC INITNORM

PROC INDEX

FIG.11

PROC PLANDEF

FIG. 12

PROC HANDROT

FIG. 13

PROC DISTDIFF

FIG. 14

METHOD AND DEVICE FOR CALIBRATING A SENSOR ON AN INDUSTRIAL ROBOT

TECHNICAL FIELD

The invention relates to a method for calibrating a sensor which is mounted on a hand of an industrial robot. The sensor is adapted to sense the position, relative to the sensor, of an object. The robot has a control system adapted, during automatic operation, to control the robot in a path defined by points in a system of coordinates assocated with the robot. By "point(s)" is meant here position plus orientation.

The invention also relates to an industrial robot with a sensor, mounted on the robot hand, which is adapted to sense the position, relative to the sensor, of an object. The robot has a control system adapted, during automatic operation, to control the robot in a path defined by points in a system of coordinates associated with the robot.

BACKGROUND ART

It is previously well known to use, for the control of industrial robots, sensors mounted on the robot hand. One example of such a field of application is automatic welding by means of an industrial robot, in which the sensor can be utilized both for detecting a weld joint and for automatically tracking the joint during the welding operation. Examples of such robot installations are described in prior US patent application Ser. No. 597,298 (filed on Apr. 6, 1984, now abandoned, in the names of Edling et al.) British application Nos. 2 088 095 and 2 110 427, and U.S. Pat. No. 4,306,144. Examples of sensors which are suitable for use in such installations are additionally described in U.S. Pat. Nos. 4,417,127 and 4,501,950.

A common problem with robot installations of the kind described above is that the coordinates of the sensor must be related to the coordinate system of the robot. In prior art installations it has been found that an individual calibration of each sensor must be carried out after its mounting on the robot. The reason for this is that inaccuracies in the attachment of the sensor and unavoidable variations in dimensions and in measuring systems between different examples of the same sensor type have made it impossible to attain the often very high requirements for accuracy (typically of the order of magnitude of ±0.1 mm) in the positioning of the work tools of the robot without the calibration mentioned. A manual calibration of a hitherto known kind is very time-consuming and entails, for example during replacement of a defective sensor, a considerable loss of production.

It has been proposed to design the sensor and its attachment in such a way as to obtain a mechanically very well-defined sensor mounting. However, such an embodiment would require a very high accuracy of the sensor attachment and of the mechanical construction of the sensor and of its measuring system. However, even with a high accuracy in these respects, it would probably be impossible to fulfil the demands which are often placed on an accurate positioning of the robot tool. Furthermore, for practical reasons, only one way or a few ways of mounting the sensor on the robot could be used in each particular case. This is a considerable disadvantage, since it is often very desirable to be able to mount the sensor in an arbitrary way in relation to the tool in view of the demands for accessibility which may be placed in each particular case.

From published European patent application Nos. 42 960 and 114 505, and from published International patent application WO85/03368, various methods are known for determining the position of the hand of an industrial robot independently of the robot's positioning system, and for calibration of the robot's positioning system. There are no suggestions in these publications of the particular problems of calibrating a sensor mounted on a robot hand, i.e. of determining the relation between the coordinate system of the robot and the coordinate system of such a sensor.

OBJECTS OF THE INVENTION

One object of the invention is to provide a method and a device for effecting calibration of a robot sensor in a rapid and simple manner, i.e. making possible a rapid and accurate determination of the relation between the coordinate systems of the sensor and the robot. A further object is to provide a calibration with a minimum of manual operations to enable a very rapid calibration and to reduce the risk of operator errors. A still further object is to make possible a calibration which can be carried out very rapidly and simply after each installation of or replacement of a sensor; the latter in order to reduce the accuracy requirements on the sensor and its attachment and to enable a sensor to be mounted in an arbitrary manner in relation to the tool.

SUMMARY OF THE INVENTION

In a method according to the invention, the above-noted objects are achieved by automatically carrying out a calibration program of the robot control system, during which calibration the sensor is moved to a number of points associated with a calibration object located at a known position in the robot coordinate system, a number of measurments is carried out at each point of the position of the object in relation to the sensor, and on the basis of the measurements those transformations are determined which transform the values measured by the sensor to the position of the measuring point in the robot coordinate system.

In a device according to the invention, the objects noted above are achieved by providing the device with members adapted, for calibration of the sensor, to move the sensor automatically to a number of points associated with a calibration object located at a known position in the robot coordinate system, to carry out at each point a number of measurements of the position of the object in relation to the sensor, and to determine, on the basis of the measurements, those calibrations which transform the values measured by the sensor to a position in the measuring point expressed in the robot coordinate system.

BRIEF DESCRIPTION OF THE DRAWINGS

Examples of a method and a device according to the invention will be described, by way of example, in the following with reference to the accompanying drawings, wherein.

DESCRIPTION OF THE PREFERRED EMBODIMENT

The chosen example of an embodiment of the invention, which will be described below, relates to the application of the invention to an industrial robot adapted for electric welding. The robot installation is shown schematically in FIG. 1. The actual industrial robot comprises a bottom plate 1 arranged on a fixed foundation, a column 2 movable about a vertical axis, a lower arm 3, an upper arm 4 and a wrist 5. The lower arm 3 is movable relative to the column 2, the upper arm 4 relative to the lower arm 3 and the wrist 5 relative to the upper arm 4 around horizontal axes arranged through the joints between the different components. A welding torch 6 is supported by the robot hand 5, and the working point (the end of a welding wire) of the torch 6 is designated TCP (tool centerpoint). The robot hand 5 also supports an optical sensor 7, which is only schematically shown in FIG. 1. The sensor 7 operates with so-called optical triangulation, i.e. it emits a light beam and senses the light diffusely reflected from a measuring point 8 of the object. In this way, the distance between the sensor 7 and an object can be determined. By scanning the measuring point 8 back and forth in a direction which makes an angle with, for example, a welding joint, the position of the joint in a lateral direction in relation to the sensor 7 can also be determined. The sensor 7 may be of the type described in the prior U.S. application Ser. No. 597,298. As an example of a work object, FIG. 1 shows the creation of a weld at a joint 11 between two sheets 12 and 13.

Figure 1:
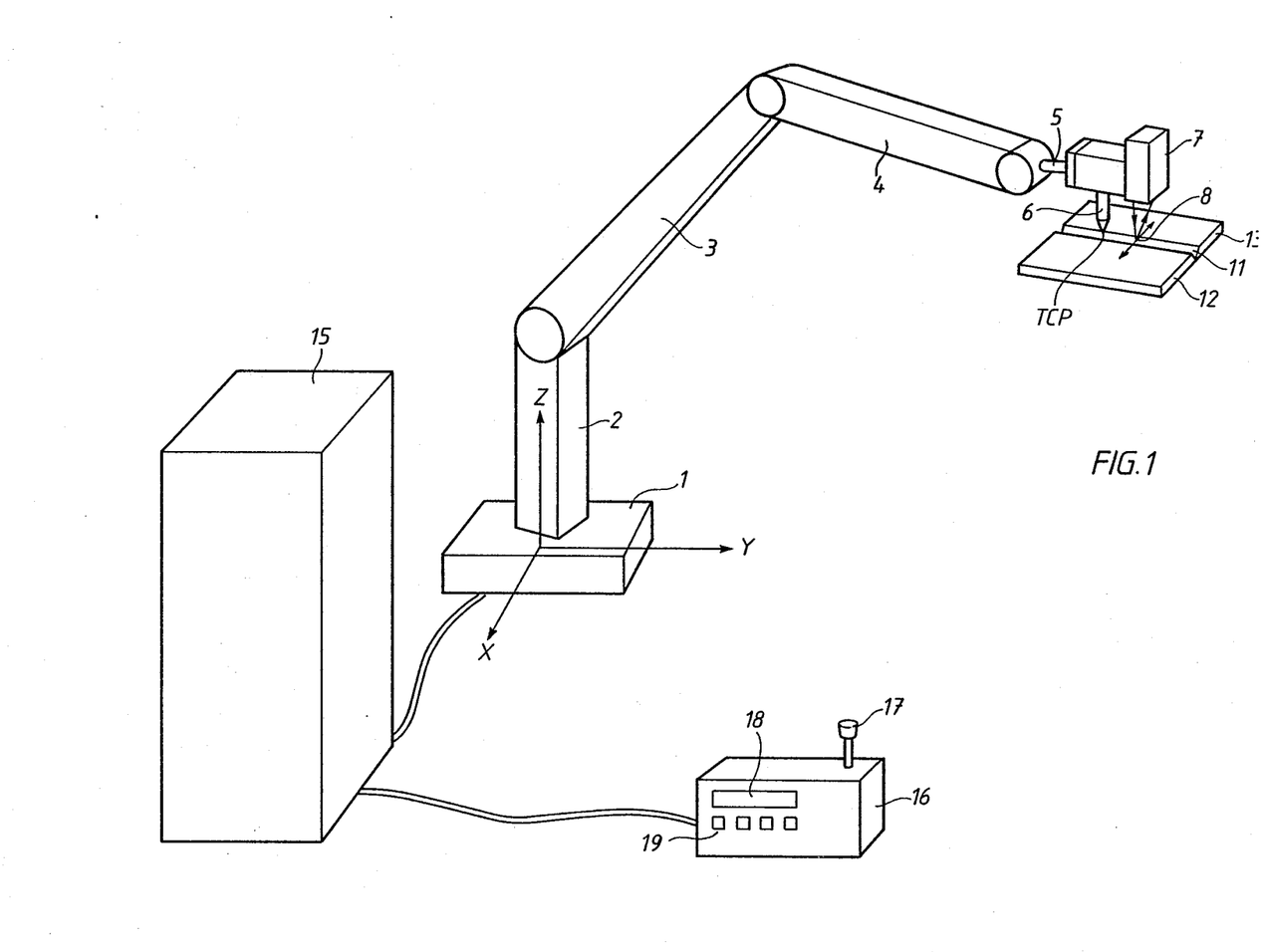
FIG. 1 shows an industrial robot adapted for welding along a joint by means of an optical sensor.

The robot equipment illustrated in FIG. 1 also comprises a control cabinet 15, which includes power supply equipment, drive means for the different shafts of the robot, memory means for storing a program for the work of the robot, and a computer which controls the robot during the programming and during automatic operation and which carries out the necessary calculations. For communication between an operator and the robot equipment during the programming and/or the automatic operation, an operating unit 16 is provided which is connected to the control cabinet 15. The operating unit 16 comprises a joystick 17, by means of which the positioning of the robot can be executed during the programming stage. In addition, the unit 16 comprises presentation means 18 and a number of schematically shown operating pushbuttons 19, by means of which commands and numerical data can be supplied to the control system of the robot.

In robot equipment of the above-mentioned kind, the sensor can be used partly for enabling the robot to find the weld joint and partly for enabling a tracking of the weld joint while welding is in progress. In certain known equipment of this kind, the sensor is used to give minor corrections to a welding path which has been programmed in advance. However, the invention relates primarily to that case in which the position of the weld joint, determined by the sensor, is transformed to that coordinate system in which the control signals of the robot are expressed, which makes possible tracking of an arbitrary welding path without any pre-programming of a path being necessary.

The so-called basic coordinate system of the robot is a rectangular system, which in FIG. 1 is designated X, Y, Z and is associated with the floor mounting point of the robot.

Figure 2A:
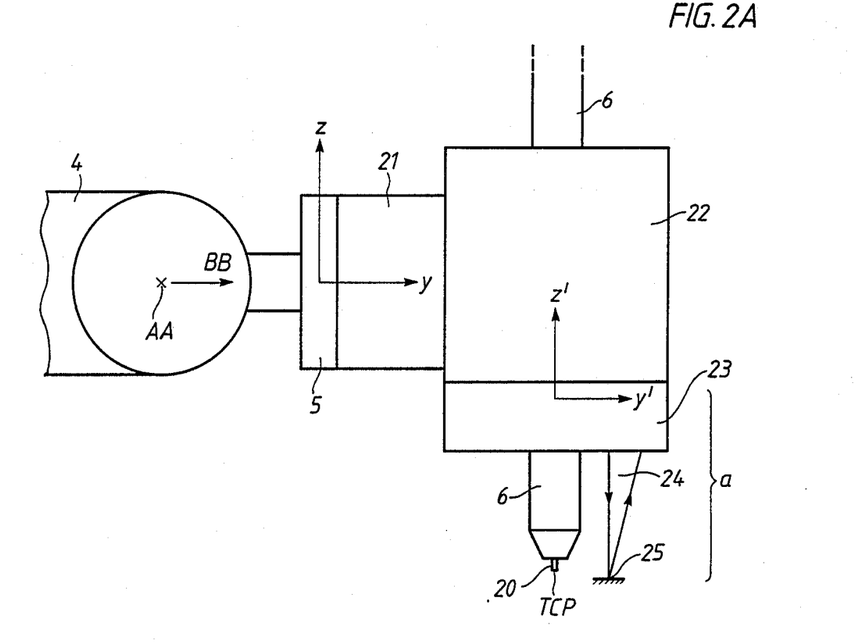
FIGS. 2A, 2B and 2C show in more detail the design of the sensor and its attachment to the robot.
Figure 2B:
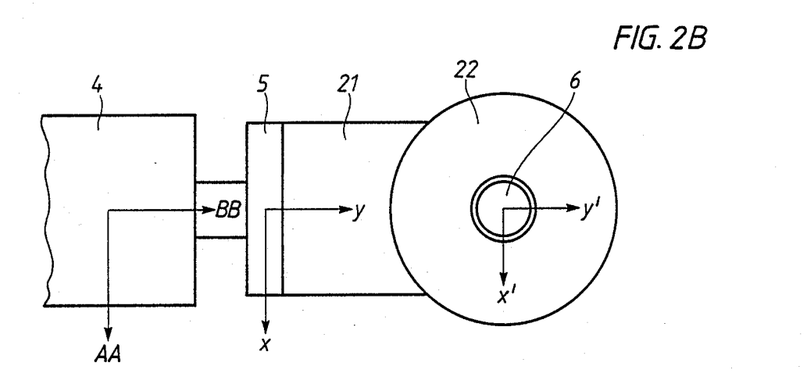

FIGS. 2A and 2B show how, in the example chosen, the welding torch 6 and the sensor 7 are arranged on the robot hand 5. The hand 5 is rotatable relative to the upper arm 4, partly around an axis AA perpendicular to the plane of the paper, partly around an axis BB coinciding with the longitudinal axis of the hand 5. The mechanical construction of the sensor is described in Swedish patent application No. 8603655-5 (filed in Sweden on Sept. 1, 1986 and subsequently filed in the USA in the name of Barkman et al Ser. No. 087,819 filed 8-21-87), which also shows how the welding torch 6 is mounted on the sensor housing. The sensor 7 comprises a housing 21, 22, which is fixedly applied to the robot hand 5. Below the circular part 22 of the housing a similarly circular sensor unit 23 is arranged. The sensor unit 23 can be turned around an axis which approximately coincides with the symmetry axis of the circular housing part 22 by means of a drive motor arranged in the housing part 21. In this way, a measuring point 25 of the sensor can be moved to an arbitrary point on a circle with its center at the tool centerpoint, TCP. The welding torch 6 is housed in a centrally arranged channel in the housing 22. The tool centerpoint (TCP) of the welding torch 6 consists of the end of a welding wire 20. The sensor unit 23 emits a light beam 24 which illuminates an object at the measuring point 25. Light reflected from the measuring point 25 is received by the sensor unit 23, and the angle between the emitted and received light provides a measure of the distance "a" between the object and the sensor.

Figure 2C:
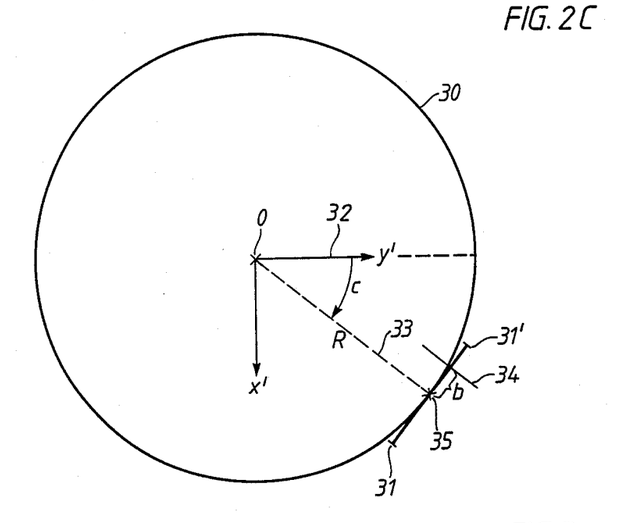

FIG. 2C shows how the measuring point 25, by turning (indexing) the sensor unit 23, can be moved along a circular line 30. The angle of rotation of the sensor unit 23, which is the difference between a zero position 32 and the current position 33 of the sensor unit 23, is designated c.

By means of an oscillating mirror arranged in the sensor unit 23, the measuring point 25 can be periodically moved back and forth over a distance 31—31' along a line which is tangential to the circular line 30 at a point 35. Upon the passage of the measuring point 25 through a sheet edge, a weld joint, or the like, a discontinuity arises in the distance measured by the sensor, and the sensor determines, in a manner known per se, the distance b along the scn distance between the discontinuity 34 and the mid-point 35 of the scan.

FIGS. 2A–2C show a coordinate system x, y, z associated with the robot hand 5, as well as a coordinate system x', y', z' associated with the sensor. Owing to unavoidable variations in the configuration of the sensor itself as well as in the attachment of the sensor to the robot hand, both the position and the orientation of the coordinate system x', y', z' relative to the system x, y, z will deviate from the nominal values.

Figure 3:
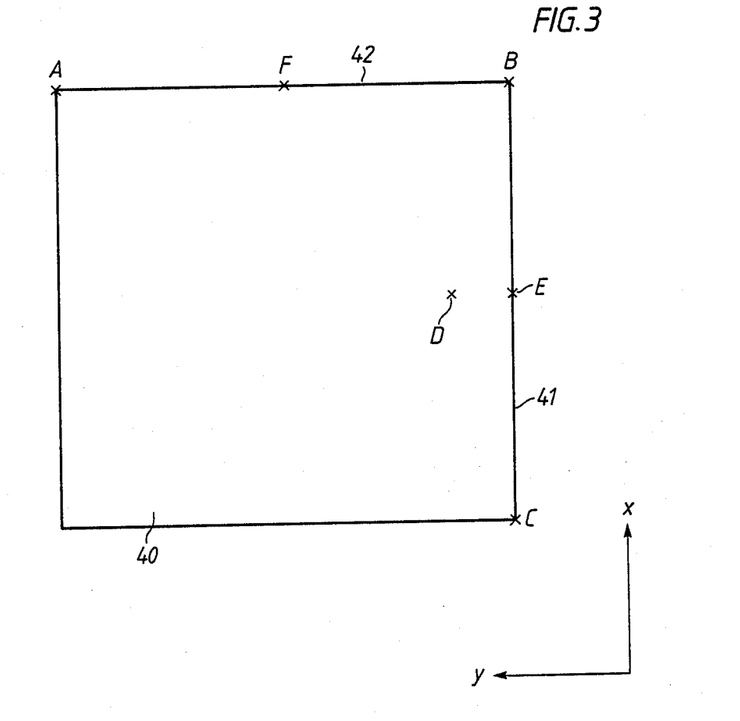
FIG. 3 shows a calibration plate used during the calibration.

FIG. 3 shows a calibration plate 40 used during the calibration process according to the invention. The plate 40 is plane and rectangular and three of its corners are designated A, B and C. The mid-point of the edge 41 of the plate 40 is designated E and the mid-point of the edge 42 of the plate 40 is designated F. D designates a point which is located on the plate 40 a certain distance away from the point E. During the calibration the plate 40 is located relatively horizontally below the sensor/welding torch. The direction of the edge 41 of the plate 40 is suitably arranged such that it approximately coincides with the x-direction of the coordinate system of the robot hand.

Figure 5:
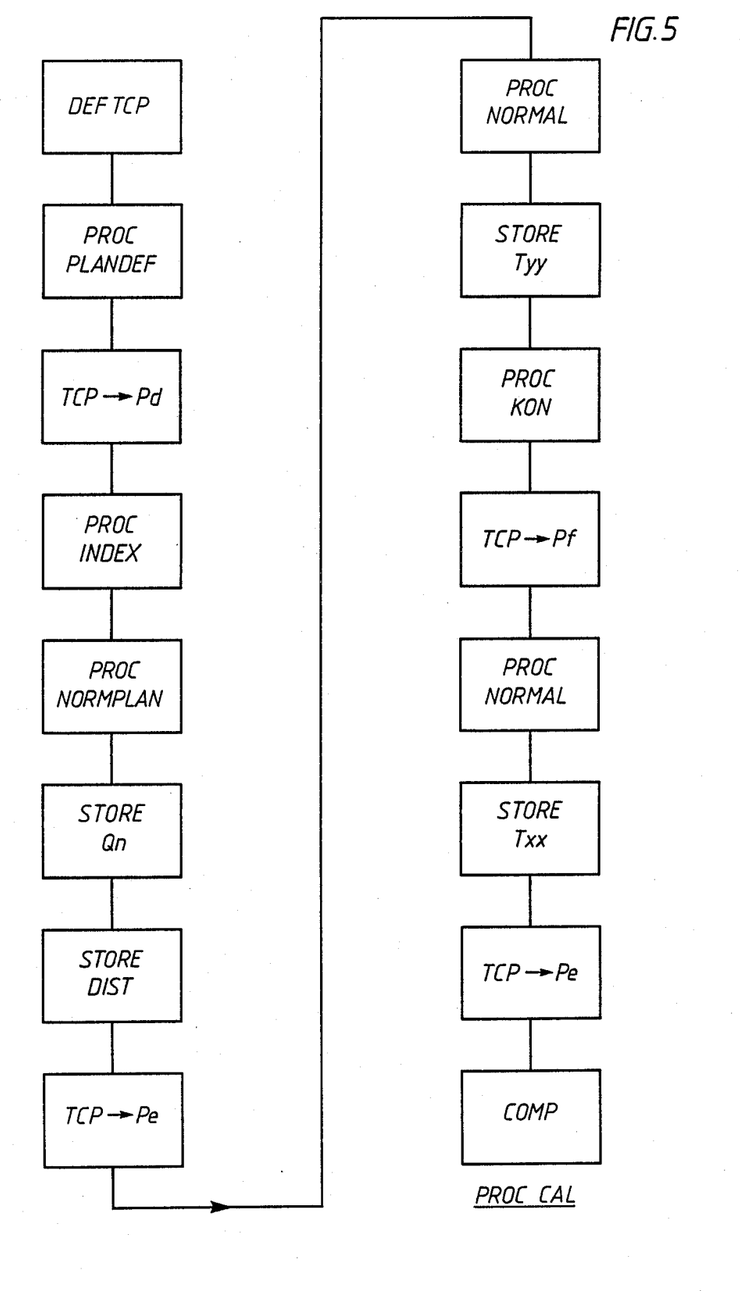
FIG. 5 shows a main flow diagram of the calibration process.
Figure 6:
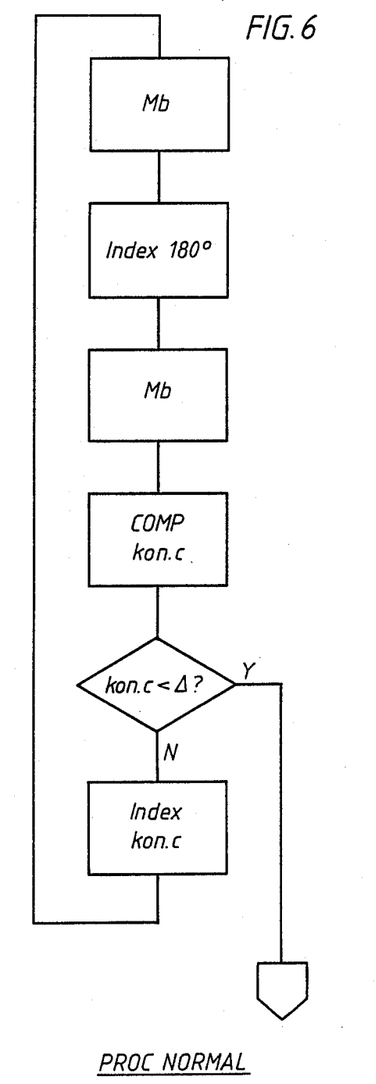
FIGS. 6–13 show sub-procedures used during the calibration process.
Figure 7:
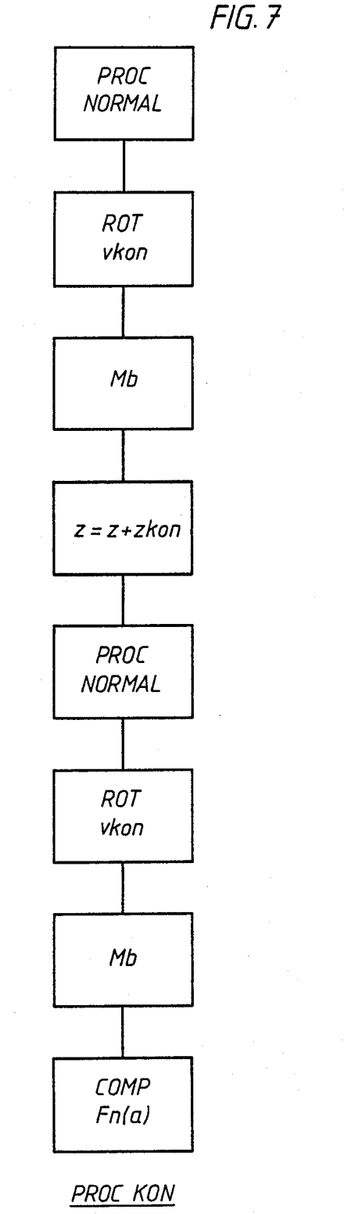
Figure 8:
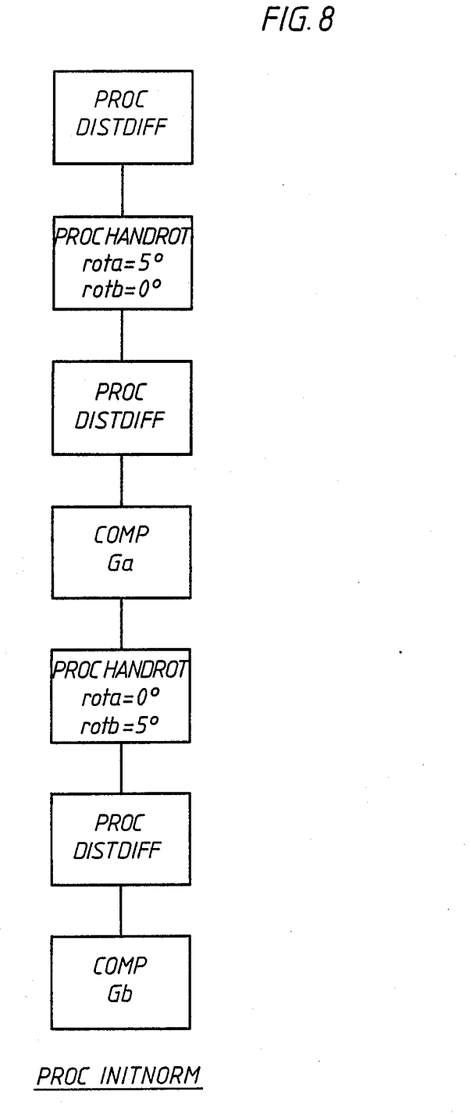

The calibration process according to the invention will be described in the following with reference to the accompanying FIGS. 5-13. FIG. 5 shows in the form of a flow diagram the course of the calibration, and FIGS. 6-13 show flow diagrams of sub-procedures used during the calibration.

The process is started by defining the position of the tool centerpoint (TCP). The robot is then moved to such a position that TCP is located at a point whose position in the basic coordinate system of the robot is known. Since the position and orientation of the wrist coordinate system x, y, z of the robot at each moment is known, expressed in the basic coordinate system of the robot, the position of TCP in the wrist coordinate system of the robot is obtained and henceforth during the calibration process also in the basic coordinate system X, Y, Z of the robot.

Figure 11:
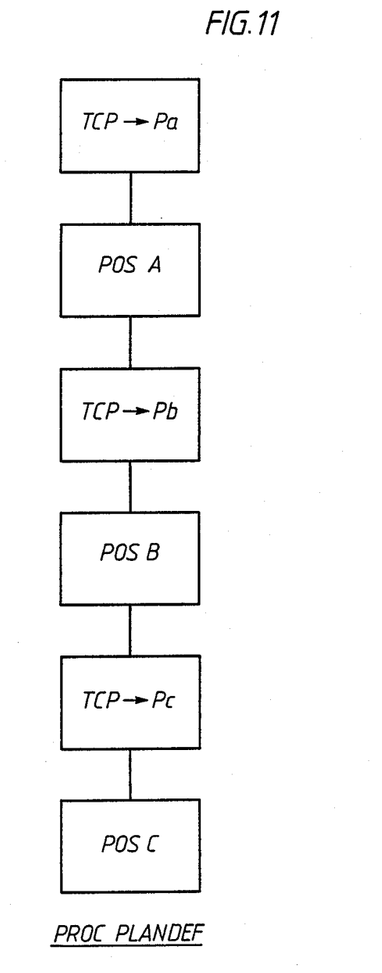

In the next stage of the calibration process, PROC PLANDEF, the calibration plane is defined by moving TCP manually to three of the corners A, B, C of the plate 40. FIG. 11 illustrates how this is done. TCP is first moved to corner A (position Pa). By activating an operating member on the control unit 16, data giving the position of corner A is stored. The robot is then moved to position Pb in corner B, whereupon data giving this position is stored, and the corresponding procedure is repeated for corner C.

The manual part of the calibration process is now completed, and with the storage of data giving the position of corner C, the remaining part of the calibration process takes place automatically. The calibration is controlled by a calibration program stored in advance in the program memory of the robot computer, which program is built up in accordance with the principles illustrated in the flow diagrams in FIGS. 5-13.

Figure 13:
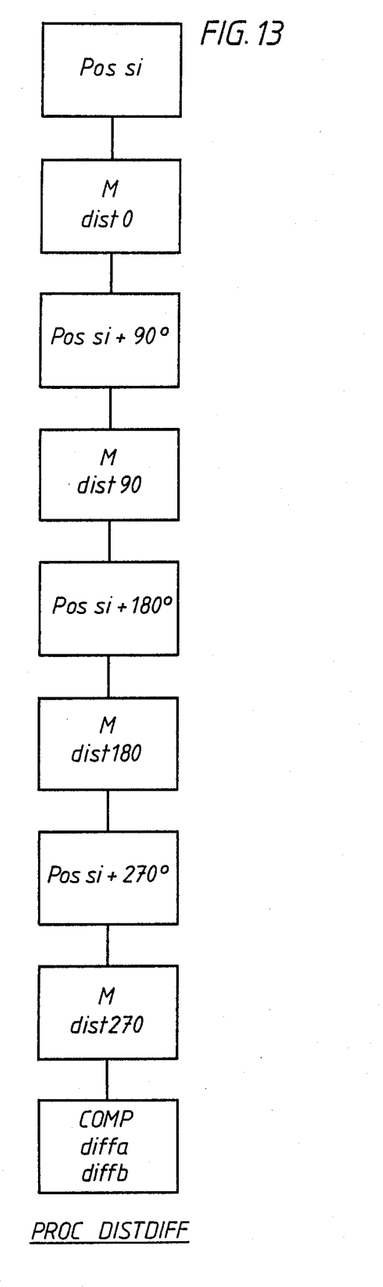

TCP is now moved to position Pd of point D in FIG. 3. This point is so chosen that it is positioned on the plate 40 at a small distance away from the mid-point E of the edge 41 of the plate. The distance of this point from the edge 41 is such that the measuring point of the sensor, when rotating the sensor one full turn, will all the time be located on the plate. Thereafter, a rough determination is made in PROCINDEX (see FIG. 10) of that sensor coordinate (sensor index) in which the triangulation plane of the sensor is perpendicular to the axis of rotation AA of the rotor wrist (see FIGS. 2A and 2B). Assuming a value zero of the sensor index, a distance measurement is performed by the sensor at four points, displaced 90°, around the axis of rotation of the sensor. This procedure is illustrated in FIG. 13, PROC DISTIFF. The sensor unit is first rotated to that position which corresponds to the assumed value of the sensor index si. This means that the angle c (FIG. 2C) is set at si, which in the current case is assumed to be zero. In this position of the sensor unit, a first distance measurement is made (M=dist0). The sensor unit is then rotated 90°, and a renewed distance measurement is made at that point, which produces the distance value dist90. When the two further distance measurements have been taken at dist180 and dist270, the quantities diffa and diffb are calculated, where $$diffa = dist180 - dist0$$

$$diffb = dist270 - dist90$$

Figure 9:
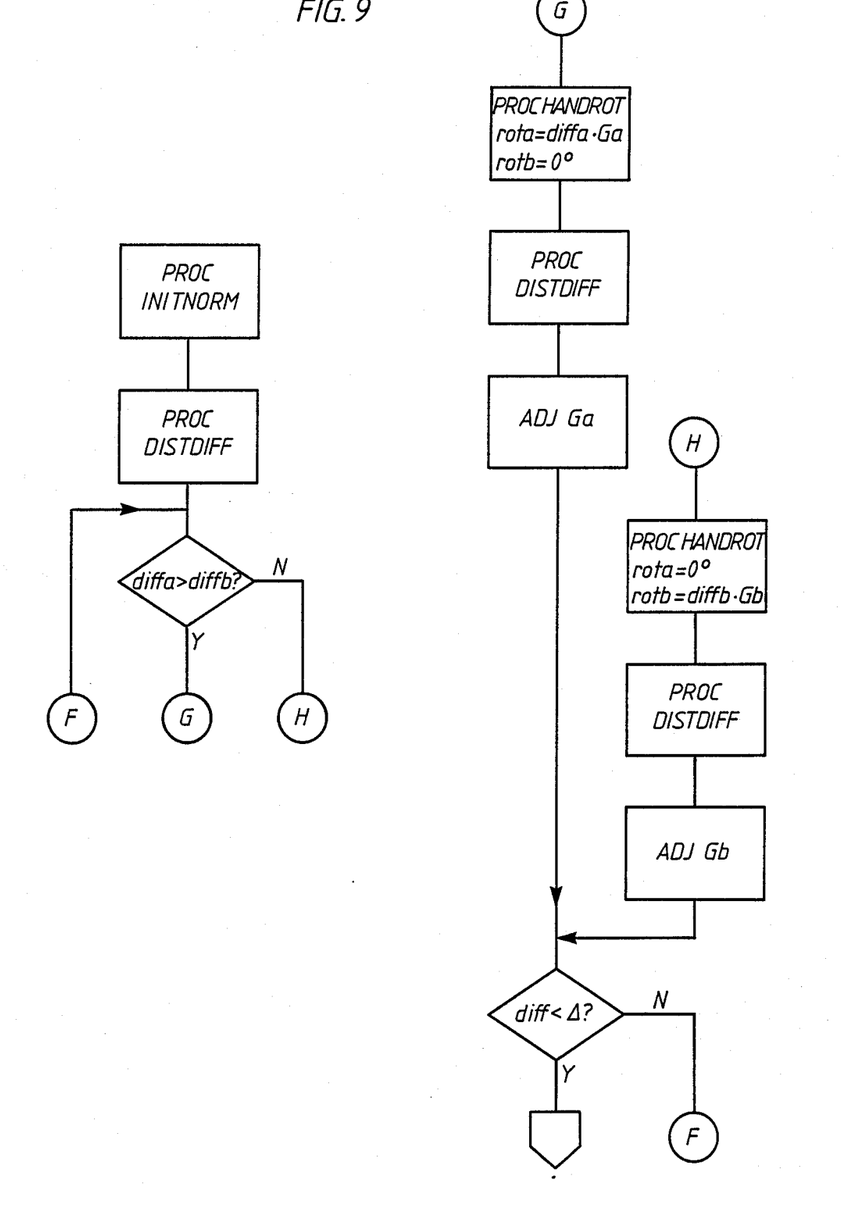
Figure 10:
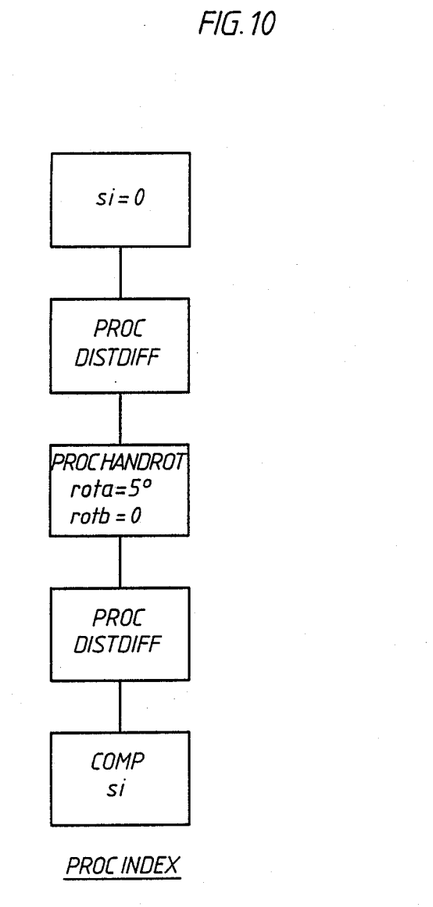
Figure 12:
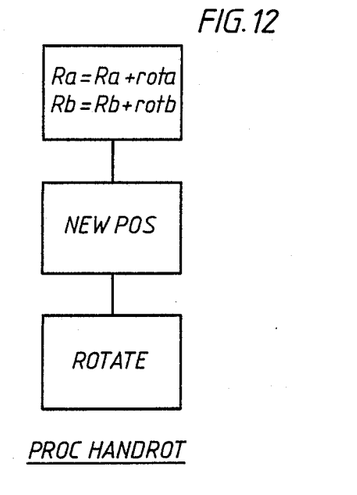

After this, a rotation of the wrist through a predetermined angle is performed (PROC HANDROT, FIG. 12). In this procedure, the wrist is rotated about the axis AA in FIG. 2 from its original angular position Ra to a new position Ra+rota, and a rotation takes place around the axis BB in FIG. 2 from the original position Rb to a new position Rb+rotb. In the current case, rota is set at 5° and rob at 0°. First the new axis coordinates are determined ($Ra = Ra + rota$; $Rb = Rb + rotb$). Thereafter (NEWPOS) the new position is expressed as basic coordinates (X, Y, Z) and hand orientation. Finally (ROTATE) a positioning order is sent with a new hand orientation with original basic coordinates (the position of the point Pd). The new orientation of the robot hand is calculated (NEWPOS). Thereafter, the robot is ordered (RET TCP) to move TCP to the position it had before the rotation, but with unchanged orientation of the robot hand. After this, a renewed distance measurement (PROC DISTDIFF) is made at four points displaced 90°. This produces changed values of diffa and diffb, and finally a value is calculated (COMP si) of the sensor index from the changes of diffa and diffb which are caused by the rotation rota. The calculation is made such that, with the sensor set at the calculated value of the sensor index, a rotation around the axis AA only influences the measured values dist0 and dist180 and that a rotation around the axis BB only influences the measured values dist90 and dist270. Thereafter follows (PROC NORMPLAN) an adjustment of the sensor position such that the axis of rotation of the sensor becomes parallel to the normal vector of the calibration plane. The flow diagram for this procedure is illustrated in FIG. 9, and the procedure starts with the sub-procedure PROC INITNORM, illustrated in FIG. 8. In this procedure exchange factors Ga and Gb are calculated which describe the effect on diffa and diffb of rota and rotb, respectively. First, PROC DISTDIFF is carried out, which produces values of diffa and diffb. Thereafter, PROC HANDROT is carried out with rota=5° and rotb=0°, after which PROC DISTDIFF is repeated. After that, the exchange factor Ga is calculated (COMP Ga), which is the quotient between the change in rota and diffa. In the next stage, PROC HANDROT is carried out with rota=0° and rotb=5°, whereafter PROC DISTDIFF is repeated. From the change in diffb obtained, the exchange factor Gb is calculated (COMP Gb), which is the quotient between the change in rotb and diffb. As the next stage in PROC NORMPLAN (see FIG. 9), PROC DISTDIFF is carried out again, which produces current values of diffa and diffb. As the next stage a comparison is made between diffa and diffb. If diffa is greater than diffb, the procedure shown at ⓖ in FIG. 9 is followed and PROC HANDROT is performed as the next step with $$rota = diffa \times Ga$$

and with $$rotb = 0°.$$

After this, a renewed distance measurement is made at four points, PROC DISTDIFF, and finally, ADJ Ga, an updating is made of the exchange factor Ga. Eventually, a comparison is made of both diffa and diffb with a predetermined low limit value Δ. If both diffa and diffb are lower than the limit value, PROC NORMPLAN is completed. If both values exceed or if any of the values exceed the limit value, the whole procedure is repeated as shown at (F) in FIG. 9.

If, in the third step in PROC NORMPLAN, diffa is not greater than diffb, the procedure shown at (H) in FIG. 9 is followed so that PROC HANDROT is carried out with $$rota = 0°$$

and with $$rotb = diffb \times Gb$$

whereafter a distance measurement (PROC DIST-DIFF) and an updating of the exchange factor Gb (ADJ Gb) are made.

In the manner described above, successively smaller rotations around the two wrist axes AA and BB will be made during the procedure PROC NORMPLAN until the axis of rotation of the sensor becomes parallel to the normal vector of the calibration plate 40. In the next step (see FIG. 5) there is stored (STORE Qn) the quarternion Qn which defines the hand rotation, i.e. the orientation of the robot hand, when the axis of rotation of the sensor is parallel to the normal vector of the calibration plate. In the next step (STORE DIST) the last obtained distance values dist0, dist90, dist180, dist270 are stored both separately and as mean values. The mean value Tzz is used for calculating the translation in the z-direction between the origins of the sensor coordinates and the hand coordinates. The separate distance measurements are used for compensating for any remaining parallelism error between the axis of rotation of the sensor and the normal vector of the calibration plate.

The measurements at point D are now completed, and the calibration program moves TCP to the point E, whose position Pe is defined as the mean value of the positions Pb and Pc of the corners B and C. This positioning is designated TCP→Pe in the flow diagram of FIG. 5. The orientation of the hand is maintained unchanged, i.e. it is defined by Qn.

Figure 4:
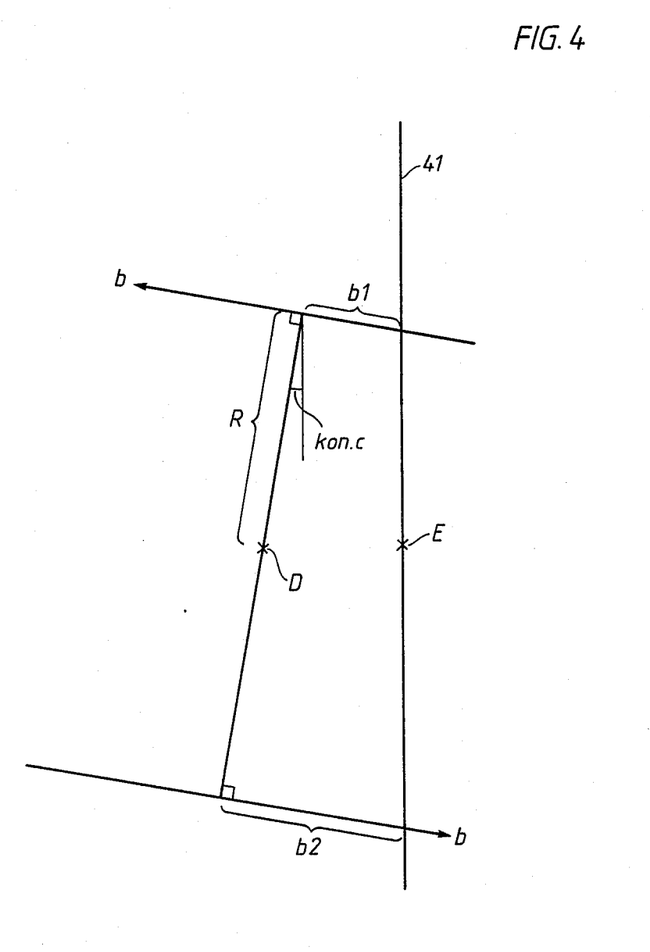
FIG. 4 illustrates a stage during the calibration process.

As the next step, PROC NORMAL is carried out (see FIG. 6), the purpose of which is partly to provide an exact value of the relation between sensor rotation and hand coordinates, and partly to provide a basis for the translation in a direction between the coordinate systems of the sensor and the wrist. TCP is now positioned at point E, whereas the intersection point between the axis of rotation of the sensor and the calibration plate (O) will generally be located in a different position. As a result of the preceding operations, the sensor will now be indexed in such a way that the sensor scan 31—31' is approximately, but generally not precisely, perpendicular to the edge 41 of the calibration plate (See FIG. 4). In this position a measurement is made (Mb) of the side coordinate b1 in the sensor scan. The sensor unit is then rotated 180° (Index 180°), whereafter the measurement is made again with the result b2. From an approximate value R of the radius of the sensor cylinder and from the difference between the two measured values b1 and b2, a measure is obtained of the angle kon.c in FIG. 4 (COMP kon.c). The angle is compared with a low limit value Δ. If the angle exceeds the limit value, the sensor is rotated by the angle kon.c and the procedure is repeated until the angle is lower than the limit value. In this way, by successive iteration, an adjusting of the sensor scan is obtained so that it becomes exactly perpendicular to the edge 41 of the plate 40. The angle kon.c which remains after the adjusting is stored and is used later on to relate the sensor rotation to the hand coordinate system.

As the next step in the calibration procedure, the mean value of the side coordinates b1 and b2, measured at point E, is stored (STORE Tyy).

Since the radius of the sensor cylinder generally does not correspond to its nominal value, and since the sensor cylinder generally exhibits a certain conicity (light beam 24 in FIG. 2A is generally not exactly parallel to the axis of rotation of the sensor), a determination of how the sensor radius varies with the distance a is required. This determination is carried out in the procedure PROC KON. The flow diagram for this procedure is to be found in FIG. 7. It starts with carrying out the procedure PROC NORMAL, which provides a setting of the sensor sweep so that it becomes perpendicular to the edge of the calibration plate. Thereafter, the sensor is rotated by a predetermined angle vkon (ROT vkon). The side coordinate b1 of the edge of the plate is read and stored (Mb). The change in the side coordinate directly produces a measure of the radius of the sensor cylinder at the distance a being used. In the next step, $z = z + zkon$, TCP is moved the distance zkon in a positive z-direction. PROC NORMAL is repeated, the sensor is rotated by the angle vkon (ROT vkon), and the change in the side coordinate is read (Mb). In the same way, at this measurement distance, the radius of the sensor cylinder is obtained from the angle vkon as well as the resultant change in the side coordinate b. Since the radius of the sensor cylinder is now known at two different measurement distances a, the radius can be determined as a linear function Fn(a) of the measurement distance a. The determination of this function is performed in the step COMP Fn(a).

Next, the calibration program (FIG. 5) moves TCP to point F, whose position Pf constitutes the mean value of the positions Pa and Pb of the corners A and B. Thereafter, PROC NORMAL is carried out, which adjusts the sensor rotation such that the sensor scan becomes perpendicular to the edge of the calibration plate. Thereafter, the mean value of the side coordinates measured during PROC NORMAL is stored (STORE Txx). After this, the calibration program positions (TCP→Pe) TCP at point E.

The last step, COMP, in the calibration program of FIG. 5 constitutes a determination of the constants in those transformation matrices which relate the values measured by means of the sensor to the wrist coordinate system x, y, z of the robot and hence to the basic coordinate system X, Y, Z of the robot. In operation of the robot, therefore, the output signals a, b, c of the sensor can be transformed directly, with the aid of the results obtained during the calibration, into indicating the position of the measuring point in the basic coordinate system of the robot.

The complete transformation matrix for transforming the measuring signals a, b, c of the sensor to the coordinate system x, y, z of the of the robot hand is obtained by concatenation of a series of transforms in accordance with $$D = TO \times Dx \times Ds \times Rx \times Ry \times T$$

where TO is a transform which expresses the measuring signals a and b in the cylindrical coordinate system of the sensor.

Dz is a transform from the cylinder coordinates of the sensor to the perpendicular coordinates x', y', z' of the sensor. This transform is a function of the angle (c−vz), where c is the sensor rotation relative to a zero position, and vz is the angle of rotation, determined during the calibration procedures, which is needed for the x'-axis to be reproduced in the xz-plane. The transform Dz is a pure rotation about the z-axis.

Ds is a transform where compensation for the conicity of the work envelope of the sensor, determined during the calibration process, is carried out. Further, with the aid of this transform a scaling of x', y', z' to the same scale as x, y, z is carried out. For compensation of the conicity, this transform is a function of Fn(a) which is determined during the calibration and which is a relative measure of the radius of the sensor cylinder as a function of the height coordinate a.

Rx is a transform which expresses the necessary rotation about the x-axis to set the z'-axis parallel to the xz-plane.

Ry is the corresponding rotary matrix about the y-axis and indicates the rotation required to bring the z'-axis to the parallel to the z-axis.

T is a translation matrix which indicates the translation between the coordinate system x, y, z of the robot hand and the coordinate system x', y', z' of the sensor.

During the implementation, D is divided acording to $$D = De \times Dk$$

where $$De = TO \times Dz \text{ and } Dk = Ds \times Rx \times Ry \times T.$$

The transformation matrix Dk is calculated during the calibration and is thereafter used without any change up to the next calibration. The transform De is dependent on the parameters which vary during the program execution. The components of De are determined each time the transform is used.

The invention has been described in the foregoing with reference to an example relating to an industrial robot adapted for electric welding with a sensor for tracking a weld joint during the welding operation. The invention can, of course, be applied also to industrial robots adapted for other applications. Further, the invention has been described with reference to one single sensor type, namely, a sensor mounted rotatably around the tool, which determines the distance to an object by means of optical triangulation. The invention can, of course, be applied also to sensor types other than that described above.

Figure 14:
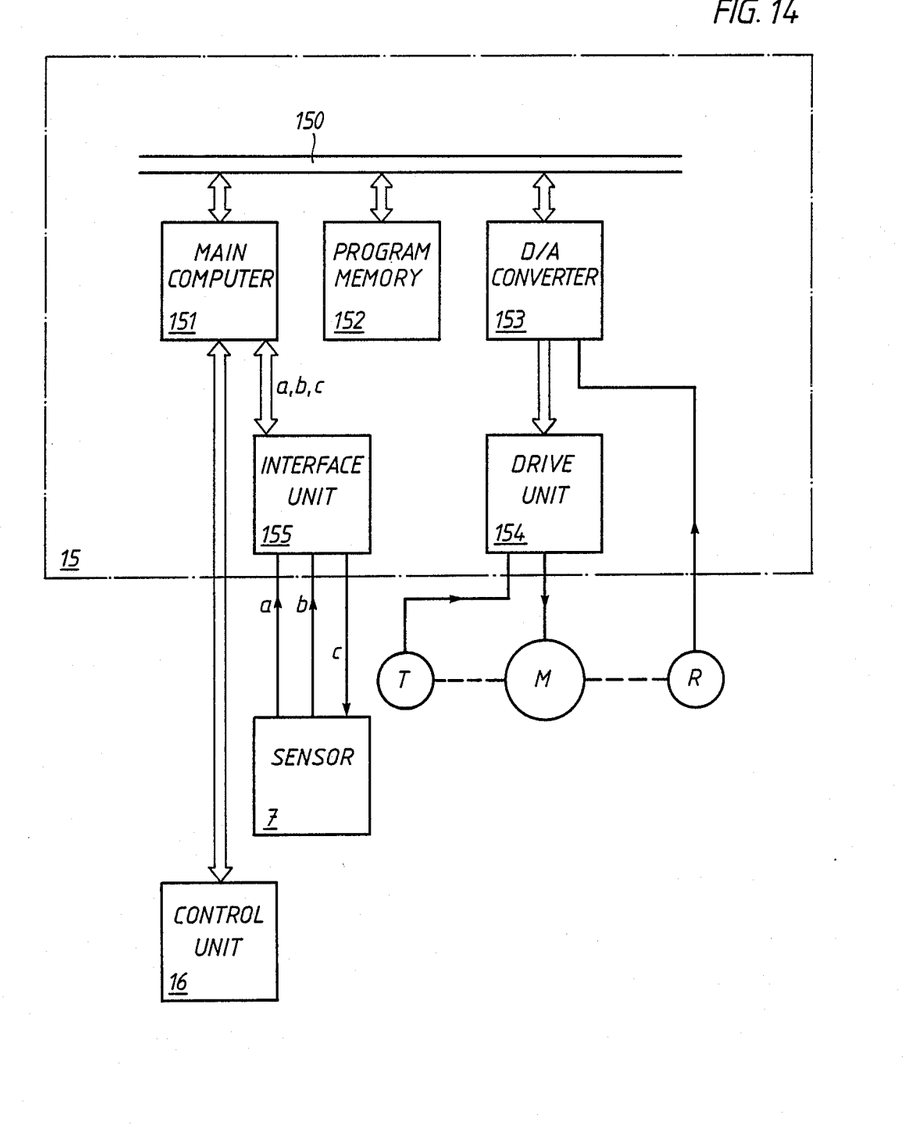
FIG. 14 shows schematically an example of a control system for carrying out the calibration process according to the invention.

FIG. 14 shows an example of the arrangement of the control circuits for carrying out the calibration process. The control cabinet 15 of the robot includes a databus 150 to which are connected a main computer 151, a program memory 152, and a D/A converter 153. The main computer 151 executes the necessary calculations and logical decisions for operation of the robot. The computer 151 is connected by way of a digital channel to the control unit 16 and exchanges operating and information signals with this unit. During the programming of the robot, the coordinates for a number of points determining the desired path of the robot, expressed in the robot coordinate system, are stored in the memory 152. For simplicity, a drive unit 154 and the A/D converter 153 have only been shown for one single axis of the robot. The D/A converter 153 delivers control signals to the drive unit 154 which, in principle, is a servodevice for control of the drive motor M belonging to the axis in question. A tachometer generator T is connected to the motor M, from which generator a feedback signal is supplied to the drive unit 154. Further, a resolver R is connected to the shaft in question, which resolver supplies a signal, corresponding to angle of rotation around the axis, to the unit 153. The sensor 7 is connected, via an interface unit 155, to the computer 151. The sensor supplies to the computer 151 the measuring signals a and b, and the sensor receives from the computer 151 a signal c for setting the angle of rotation c of the sensor. The calibration program, described above with reference to FIGS. 5-13, is stored once and for all in the control system, for example in the memory 152. While carrying out the calibration program, the computer 151 calculates in the manner stated above the necessary constants in those transformations which are needed to express the position of the measuring point, defined by signals a, b, c in the robot coordinate system. During the calibration program, the necessary control signals are also supplied by the computer 151 to the different robot axes for moving the robot to the different calibration points. In addition, in dependence on the stored calibration program, the computer 151 also attends to the execution of the necessary rotations of the sensor and the storing of the measurement results.

What is claimed is:

1. A method for calibrating a sensor of an industrial robot which is mounted on a hand of the robot, the sensor being adapted to sense the position, relative to the sensor, of an object, the robot having a control system adapted, during automatic operation, to control the robot in a path defined by points in a robot coordinate system,
wherein
a calibration program is automatically carried out by the control system, during which the sensor is moved to a number of points differently positioned relative to a calibration object located at a known position in the robot coordinate system, a number of measurements are taken at each of said number of points of the position of the calibration object relative to the sensor, and on the basis of the measurements, transformations are determined which transform the values measured by means of the sensor to the position of the measuring point in the robot coordinate system.

2. A method according to claim 1, wherein the position of the calibration object is determined by manually controlling the robot, prior to the automatic calibration program, to a number of positions, in which a member mounted on the robot hand touches points on the calibration object, whereby the positions of these points which are thereby known in the robot coordinate system are stored.

3. A method according to claim 2, wherein the robot is controlled such that a centerpoint of a work tool mounted on the robot hand touches said points on the calibration object.

4. A method according to claim 3, wherein the calibration object consists of a plane rectangular plate, said points on the calibration object consisting of three corners of the plate.

5. A method according to claim 2, wherein the calibration object consists of a plane rectangular plate, said points on the calibration object consisting of three corners of the plate.

6. A method according to claim 5, wherein
the robot hand is first moved to a first position in which the said axis of rotation intersects the surface of the calibration plate at a distance spaced from the edge of said plate, that in this first position the said axis of rotation is set such that it becomes perpendicular to the surface of the calibration plate,
the sensor with retained orientation is moved to a second position in which the said axis of rotation intersects the surface of the calibration plate near a first edge of the calibration plate,
in this position the lateral displacement of the said axis of rotation relative to the first edge is determined, the sensor with retained orientation is moved to a third position in which the said axis of rotation intersects the surface of the calibration plate near a second edge of the calibration plate, perpendicular to the first edge, and
in this position the lateral displacement of the said axis of rotation relative to said second edge is determined.

7. A method according to claim 6, wherein a zero position for the angle of rotation of the measuring member is determined in either of said second and third positions.

8. A method according to claim 1, in which the sensor is of a type having a measuring member which is arranged to rotate around an axis of rotation and is adapted for measuring the distance between the sensor and the surface of an object in a direction substantially parallel to the axis of rotation,
wherein
the orientation of the said axis of rotation is determined by carrying out measurements of the distance to a calibration object at a plurality of rotary positions of the measuring member,
in dependence on these measurements, those angles of rotations of the robot hand are determined which orientate the said axis of rotation towards such a position that the differences between the measured distances are reduced,
the robot hand is made to perform these rotations, and
when the differences between the measured distances are lower than a predetermined limit value, the said axis of rotation is perpendicular to the surface of the calibration object, the orientation of the robot hand is stored.

9. A method according to claim 8, wherein
the robot hand is first moved to a first position in which the said axis of rotation intersects the surface of the calibration object at a distance spaced from the edge of said object, that in this first position the said axis of rotation is set such that it becomes perpendicular to the surface of the calibration object,
the sensor with retained orientation is moved to a second position in which the said axis of rotation intersects the surface of the calibration object near a first edge of the calibration object,
in this position the lateral displacement of the said axis of rotation relative to the first edge is determined, the sensor with retained orientation is moved to a third position in which the said axis of rotation intersects the surface of the calibration object near a second edge of the calibration object, perpendicular to the first edge, and
in this position the lateral displacement of the said axis of rotation relative to said second edge is determined.

10. A method according to claim 1, in which the sensor is of a type having a measuring member which is arranged to rotate around an axis of rotation and is adapted for measuring the distance between the sensor and a surface of a calibration object in a direction substantially parallel to the said axis of rotation, the measuring member being adapted to determine the lateral displacement of a discontinuity on the calibration object in a direction substantially perpendicular to the radius from the said axis of rotation to the measuring point,
wherein
the robot hand is positioned with the intersection point of the said axis of rotation with the said surface of the calibration object close to an edge of the calibration object,
and wherein
the lateral displacements of the edge are determined with the measuring member rotated to two positions displaced 180° in relation to each other.

11. A method according to claim 10, wherein the distance between the edge and the intersection point of the said axis of rotation with the surface of the calibration object is calculated on the basis f the two measured lateral displacements.

12. A method according to claim 7, wherein a zero position for the angle of rotation of the measuring member around the said axis of rotation is determined from the two measured lateral displacements.

13. A method according to claim 11, wherein the position in two separate directions of the intersection point of the said axis of rotation with the said surface of the calibration object is determined by carrying out the setting of the robot hand and the determination of the lateral displacements at two separate edges of the calibration object.

14. A method according to claim 13, wherein
the robot hand is first moved to a first position in which the said axis of rotation intersects the surface of the calibration object at a distance spaced from the edge of said object, that in this first position the said axis of rotation is set such that it becomes perpendicular to the surface of the calibration object,
the sensor with retained orientation is moved to a second position in which the said axis of rotation intersects the surface of the calibration object near a first edge of the calibration object,
in this position the lateral displacement of the said axis of rotation relative to the first edge is determined, the sensor with retained orientation is moved to a third position in which the said axis of rotation intersects the surface of the calibration object near a second edge of the calibration object, perpendicular to the first edge, and
in this position the lateral displacement of the said axis of rotation relative to said second edge is determined.

15. A method according to claim 11, wherein
the robot hand is first moved to a first position in which the said axis of rotation intersects the surface of the calibration object at a distance spaced from the edge of said object, that in this first position the said axis of rotation is set such that it becomes perpendicular to the surface of the calibration object, the sensor with retained orientation is moved to a second position in which the said axis of rotation intersects the surface of the calibration object near a first edge of the calibration object, in this position the lateral displacement of the said axis of rotation relative to the first edge is determined, the sensor with retained orientation is moved to a third position in which the said axis of rotation intersects the surface of the calibration object near a second edge of the calibration object, perpendicular to the first edge, and in this position the lateral displacement of the said axis of rotation relative to said second edge is determined.

16. A method according to claim 10, wherein the robot hand is first moved to a first position in which the said axis of rotation intersects the surface of the calibration object at a distance spaced from the edge of said object, that in this first position the said axis of rotation is set such that it becomes perpendicular to the surface of the calibration object, the sensor with retained orientation is moved to a second position in which the said axis of rotation intersects the surface of the calibration object near a first edge of the calibration object, in this position the lateral displacement of the said axis of rotation relative to the first edge is determined, the sensor with retained orientation is moved to a third position in which the said axis of rotation intersects the surface of the calibration object near a second edge of the calibration object, perpendicular to the first edge, and in this position the lateral displacement of the said axis of rotation relative to said second edge is determined.

17. A method according to claim 1, in which the sensor has a measuring member which is arranged to rotate around an axis of rotation and is adapted for measuring the distance between the sensor and the surface of a calibration object in a direction substantially parallel to the said axis of rotation, the measuring means being adapted to determine the lateral displacement of a distance discontinuity in a direction which is substantially perpendicular to the radius from the said axis of rotation to the measuring point, wherein to determine a parallelism error between the said axis of rotation and the direction between the measuring member and the measuring point, the robot hand is located with the said axis of rotation intersecting the surface of the calibration object near an edge of the said calibration object, the lateral displacement of the said edge is determined, the measuring member is rotated through a predetermined angle, the lateral displacement is again determined, and based on the change in the lateral displacement, a measure of the radius from the said axis of rotation to the measuring point is determined, whereupon the sensor is moved a predetermined distance relative to the calibration object along the said axis of rotation and the method is repeated.

18. A method according to claim 17, wherein the determination of the parallelism error takes place in either of a second position and a third position.

19. An industrial robot with a sensor mounted on a hand of the robot which sensor is adapted to sense the position relative to the sensor of a calibration object, the robot having a control system adapted, during automatic operation, to control movement of the robot along a path defined by points in a robot coordinate system, characterized in that the robot comprises members adapted, for calibration of the sensor, to automatically move the sensor to a number of points associated with a calibration object with a known position in the robot coordinate system, to carry out at each point a number of measurements of the position of the calibration object relative to the sensor, and to determine on the basis of the measurements those transformations which transform the measured values of the sensor to a position in the measuring point expressed in the robot coordinate system.

* * * * *